United States Patent [19]

Mogami

[11] 4,364,641

[45] Dec. 21, 1982

[54] WIDE ANGLE ZOOM LENS

[75] Inventor: Satoshi Mogami, Kodaira, Japan

[73] Assignee: Nippon Kogaku K.K., Japan

[21] Appl. No.: 215,752

[22] Filed: Dec. 12, 1980

[30] Foreign Application Priority Data

Dec. 28, 1979 [JP] Japan ................. 54-172197

[51] Int. Cl.³ ........................................... G02B 15/16
[52] U.S. Cl. ................................................. 350/426
[58] Field of Search ........................ 350/423, 426

[56] References Cited

U.S. PATENT DOCUMENTS

| | | | |
|---|---|---|---|
| 3,880,498 | 4/1975 | Liu et al. ............................. | 350/426 |
| 4,159,165 | 6/1979 | Betensky et al. ................... | 350/426 |
| 4,159,865 | 7/1979 | Kawamura et al. ................ | 350/426 |
| 4,196,968 | 4/1980 | Itoh ................................... | 350/423 |

FOREIGN PATENT DOCUMENTS 2907396  9/1979  Fed. Rep. of Germany ...... 350/426

Primary Examiner—John K. Corbin
Assistant Examiner—Scott J. Sugarman
Attorney, Agent, or Firm—Shapiro and Shapiro

[57] ABSTRACT

This specification discloses a zoom lens which comprises, in succession from the object side, a divergent lens group and a convergent lens group and whose magnification is changed by relative movement of the two groups. The divergent lens group comprises, in succession from the object side, three continuous negative meniscus lenses having their respective convex surfaces facing the object side and a positive lens having its surface of sharper curvature facing the object side. The convergent lens group comprises, in succession from the object side, a single biconvex positive lens, a meniscus lens comprising a doublet and having its convex surface facing the object side, a positive lens, a negative lens and two continuous positive lenses. The zoom lens satisfies predetermined conditions.

4 Claims, 12 Drawing Figures

FIG. 4A  FIG. 4B  FIG. 4C
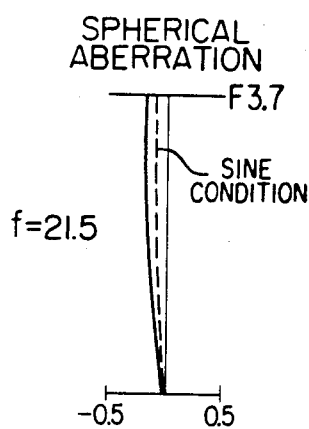
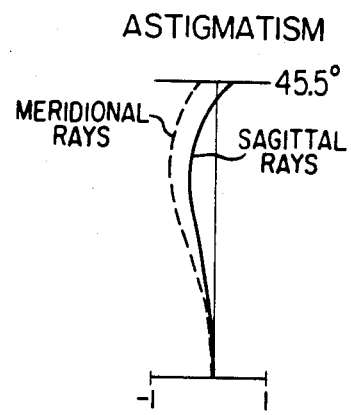
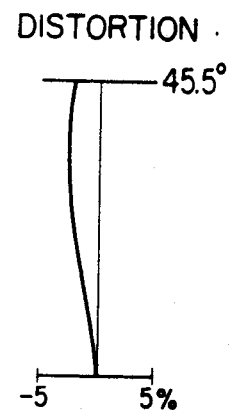
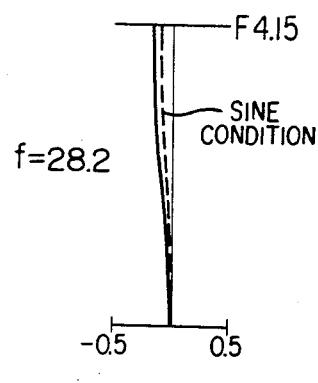
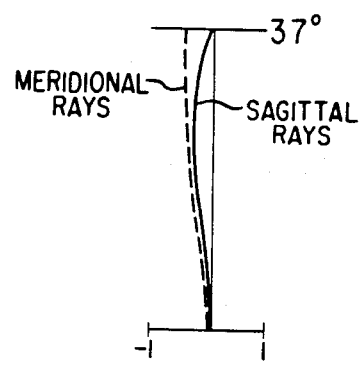
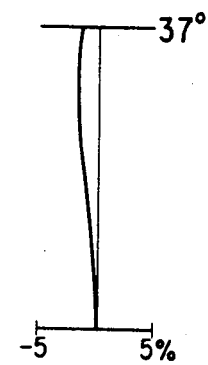
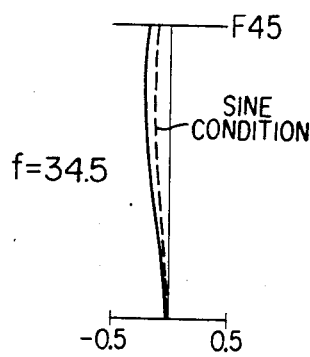
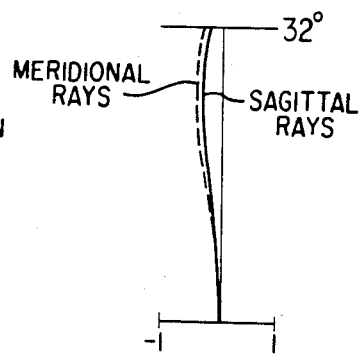
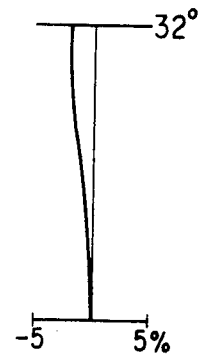

FIG. 5A
SPHERICAL ABERRATION
FIG. 5B
ASTIGMATISM
FIG. 5C
DISTORTION
f=21.5
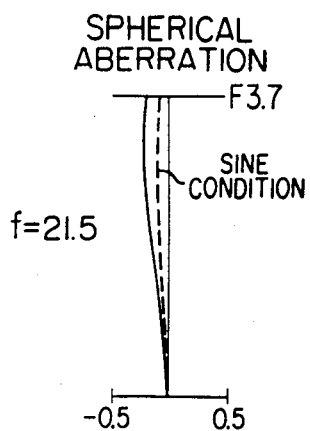
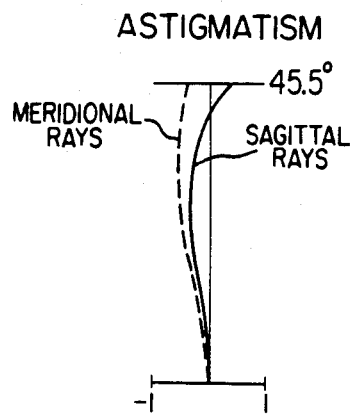
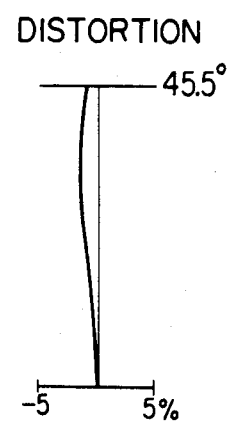
f=28.2
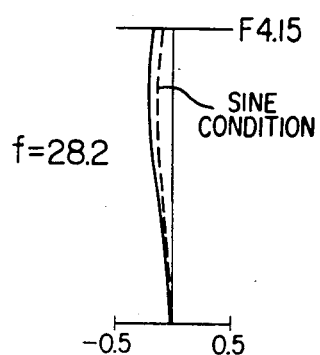
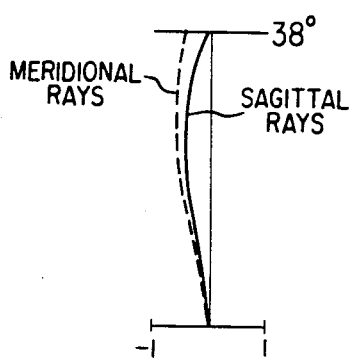
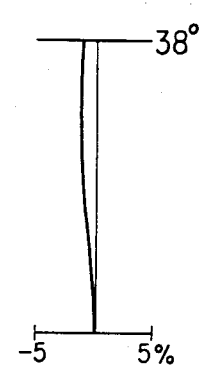
f=34.5
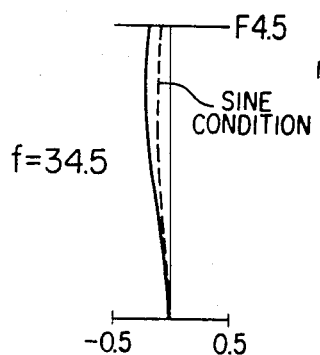
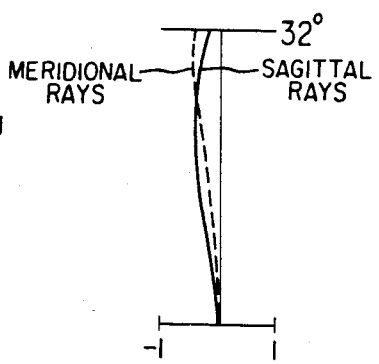
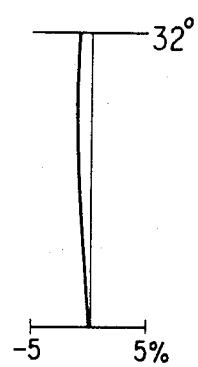

FIG. 6A
SPHERICAL ABERRATION
FIG. 6B
ASTIGMATISM
FIG. 6C
DISTORTION
f=21.5
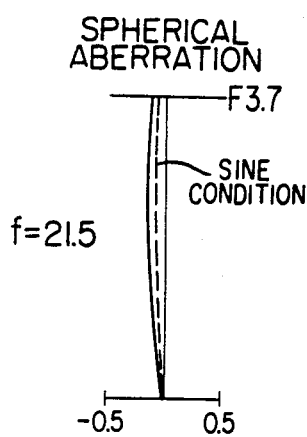 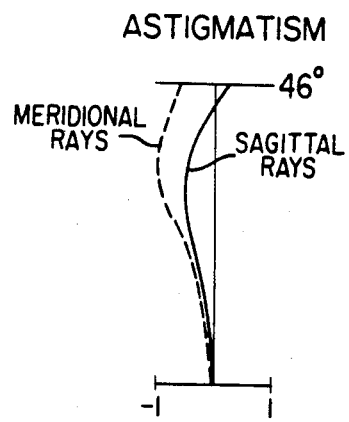 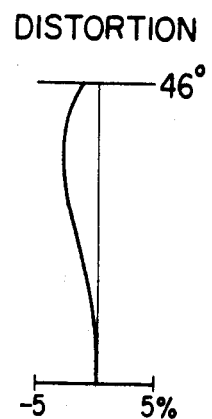
f=28.2
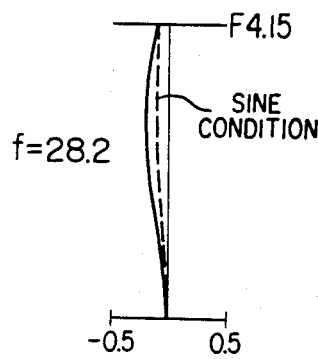 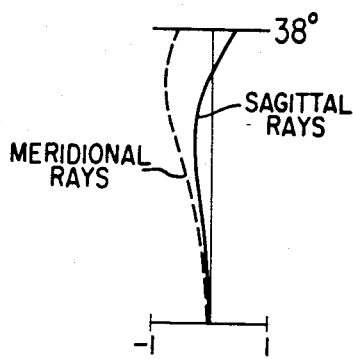 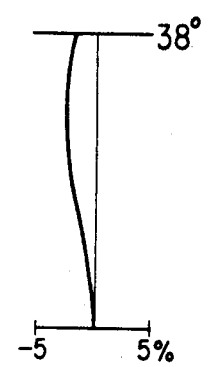
f=34.5
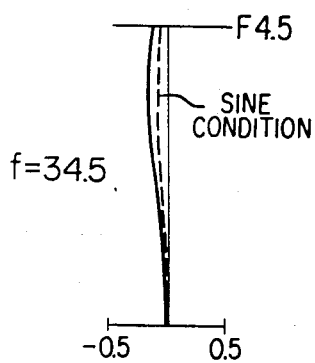 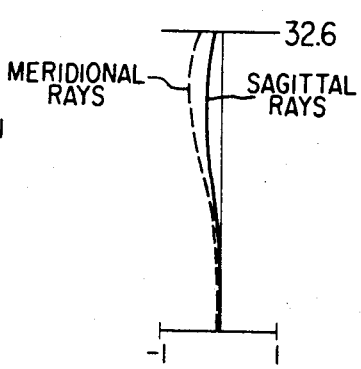 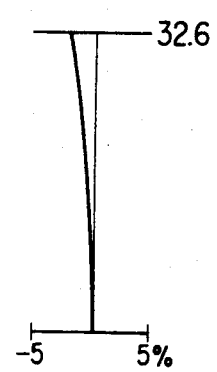

WIDE ANGLE ZOOM LENS

BACKGROUND OF THE INVENTION

1. Field of the Invention

This invention relates to a wide angle zoom lens which covers an angle of view of 90° or greater and which is compact and in which various aberrations have been well corrected.

2. Description of the Prior Art

In zoom lenses covering a wide angle of view and comprising a forward group which is a divergent lens group and a rearward group which is a convergent lens group, it has been a matter of great concern in recent years to correct various aberrations while making the lens compact. Generally, however, a zoom lens, as compared with lenses having a corresponding fixed focal length, has a great full length due to the need to secure a space available for the lens groups to move and the increased number of lens components, and the lens system in apt to become bulky. Moreover, the full length of a so-called two-group zoom lens like the zoom lens of the present invention comprising a forward group which is a divergent lens group and a rearward group which is a convergent lens group is greater at the wide angle side and therefore, the lens system becomes remarkably bulky. Particularly, the diameter of a filter mounted at a location in the lens system which is most adjacent to the object side has been considerably great in order to cover a wide angle of view, and reducing the diameter of such filter has been a great task for making the entire lens system compact. A wide angle zoom lens having an angle of view exceeding 90° is disclosed in Japanese Laid-open Patent Application No. 135658/1978 (U.S. Pat. No. 4,196,968), but this zoom lens is relatively bulky.

SUMMARY OF THE INVENTION

It is an object of the present invention to eliminate the above-noted disadvantages and to provide a zoom lens which covers up to an ultra-wide angle of view and which is compact in size and in which various aberrations have been well corrected.

The invention will become fully apparent from the following detailed description thereof taken in conjunction with the accompanying drawings.

BRIEF DESCRIPTION OF THE DRAWINGS

FIGS. 4A–4C, 5A–5C and 6A–6C illustrate the spherical aberration, astigmatism and distortion in the respective embodiments.

DESCRIPTION OF THE PREFERRED EMBODIMENTS

Figure 1:
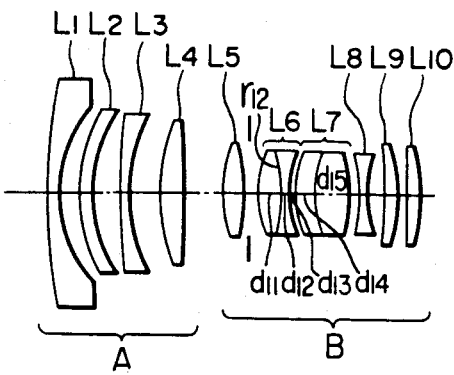
FIGS. 1, 2 and 3 are cross-sectional views of the lenses according to a first, a second and a third embodiments of the present invention.

The present invention consists in a zoom lens which comprises, in succession from the object side, a divergent lens group A and a convergent lens group B and whose magnification in changed by relative movement of the two groups and wherein the divergent lens group A comprises four lenses, i.e., in succession from the object side, three continuous negative meniscus lenses $L_1$, $L_2$, $L_3$ haiving their respective convex surfaces facing the object side and a positive lens $L_4$ having its surface of sharper curvature facing the object side and the convergent lens group B comprises, in succession from the object side, a single beconvex positive lens $L_5$, a meniscus lens $L_6$ comprising a doublet and having its convex surface facing the object side, a posiitve lens $L_7$, a negative lens $L_8$ and two continuous positive lenses $L_9$, $L_{10}$, the zoom lens satisfying the following conditions:

(I) $r_1 > 3.4 f_W$ (II) $0.9|f_A| < |f_{11}| < 1.3|f_A|$ $(f_{11} < 0, f_A < 0)$ (III) $0.9 f_W > d_{11} + d_{12} + d_{14} + d_{15} > 0.6 f_W$ (IV) $1.6 f_W > |r_{12}| > 0.8 f_W$ $(r_{12} < 0)$ where $f_A$ represents the focal length of the divergent lens group A, $f_{11}$ represents the focal length of the negative meniscus lens $L_1$ which is most adjacent to the object side, r represents the curvature radii of the lens surfaces, d represents the thicknesses of the lenses and the air spaces between the lenses, the subscripts represent the order from the object side, and $f_W$ represents the focal length of the entire system at the wide angle end.

Conditions (I) and (II) are for intensifying the refractive powers of the first surface adjacent to the object side and the foremost lens adjacent to the object side for off-axial light rays to thereby reduce the diameter of a filter mounted at a location in the lens system which is most adjacent to the object side and for keeping the principal point position of the divergent lens group at an optimal position. Light rays incident parallel to the optical axis pass through the portion of the negative meniscus lens $L_1$, which is near the optical axis and therefore, even if the refractive power for off-axial light rays is intensified in the negative meniscus lens $L_1$, it will not so much adversely affect spherical aberration and will not bring about a remarkable increase in the duty of correction for the spherical aberration in the rearward group. If condition (I) is departed from, the refractive power of the first surface for oblique light rays will become weak and result in an increased diameter of the filter. When the upper limit of condition (II) is exceeded, the refractive power of the negative meniscus lens $L_1$ for oblique light rays will become weak while, at the same time, the principal point position of the divergent lens group A will move toward the image side and therefore, the divergent lens group A will relatively move toward the object side and the entrance pupil position will become distant and thus, the diameter of the forward lens and of the filter will be increased. When the lower limit of condition (II) is exceeded, the principal point position of the divergent lens group A will move too much toward the object side and the air space between the divergent lens group A and the covergent lens group B will become too small to sufficiently secure a space available for the lens groups to move.

Condition (III) is concerned with the sum of the center thicknesses of the meniscus lens $L_6$ having its convex surface facing the object side and the positive lens $L_7$, in the rearward group, and it is a condition for increasing the length of the light path of the convergent lens group without increasing the diameter of the filter, thereby alleviating the duty of aberration correction and well correcting the off-axial aberrations which are liable to occur with the compaction of the foremost lens. The meniscus lens $L_6$ and the positive lens $L_7$ are situated more adjacent to the image side than the diaphragm and therefore, even if the length of the light path in this portion is increased, it will not adversely affect the diameter of the filter at all. Also, by increasing the length of the light path from $d_{11}$ to $d_{15}$, the height of the oblique light ray in the negative lens $L_8$ may be increased to increase the effect of correction of distortion and astigmatism by the negative lens $L_8$. If the upper limit of condition (III) is exceeded, the diameter of the lens which is most adjacent to the image side will become great and therefore, it will become difficult to secure the edge thickness and, if the lower limit of condition (III) is exceeded, astigmatism and distortion will occur. The air space $d_{13}$ between the meniscus lens $L_6$ and the positive lens $L_7$ is requisite for the correction of astigmatism, etc., and in order to make condition (III) more effective, it is desirable that $d_{13} < 0.1 f_W$.

Condition (IV) is concerned with the cemented surface of the meniscus lens $L_6$ having its convex surface facing the object side, in the rearward group, and it is a condition for correcting the chromatic aberration of spherical aberration and the chromatic aberration of astigmatism. In a zoom lens covering up to an ultra-wide angle like the zoom lens of the present invention, particularly the meridional image plane of g-line tends to be remarkably curved in the positive direction, and by providing, for the correction of this, a cemented surface in a portion wherein light rays incident parallel to the optical axis pass through a position farther from the optical axis, there may be provided the effect of correcting the chromatic aberration of spherical aberration at the same time. Since the cemented surface lies near the diaphragm, the adverse effect upon chromatic difference of magnification hardly occurs. If the upper limit of condition (IV) is exceeded, the spherical aberration of g-line will be under and the back focal length will be short because the refractive indices $n_6$ and $n_7$ of the positive lens and the negative lens joined together by this cemented surface are $n_6 < n_7$. If the lower limit of condition (IV) is exceeded, the chromatic aberrations of spherical aberration and astigmatism will occur remarkable.

The embodiment of the present invention as described above, when used as the lens system for a 35mm single lens reflex camera, has a focal length of 21.5mm–34.5mm and covers an ultra-wide angle of view amounting to 90° and yet has a considerable zoom ratio and a maximum brightness of F3.7 and, even if a filter having a diameter of 48mm is mounted at a location which is most adjacent to the object side, such embodiment can be used without being kicked over the entire zooming range and is very compact.

Figure 2:
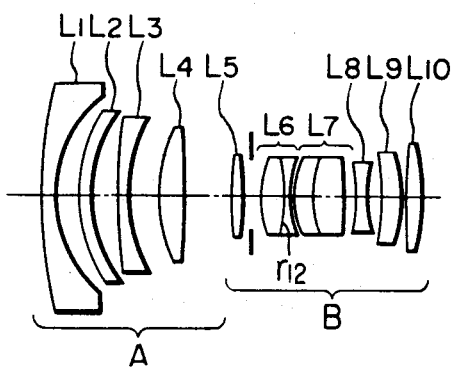
Figure 3:
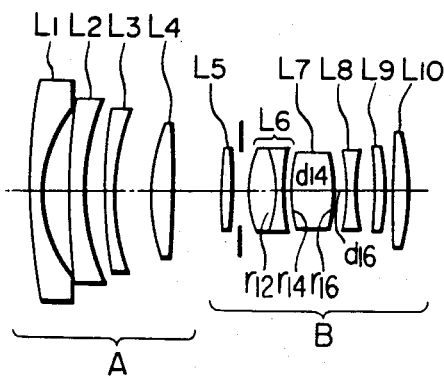

The lens constructions according to a first, a second and a third embodiment of the present invention are shown in FIGS. 1, 2 and 3, respectively. The first and the second embodiment are substantially similar in construction, but the third embodiment is one in which the cemented surface of the positive lens $L_7$ in the rearward group is eliminated, and even such construction has a sufficient performance for practical use. The various aberrations in the shortest, the intermediate and the longest focal length condition of the respective embodiments are illustrated in FIGS. 4A–4C, 5A–5C and 6A–6C, respectively.

Numerical data of the respective embodiments will be shown below. In the tables below, r represents the curvature radius of each lens surface, d represents the center thicknesses and the air spaces of the lenses, nd and νd represent the refractive index and the Abbe number, respectively, of each lens, and the subscripts represent the order of these from the object side. The constant of the non-spherical surface is also shown.

First Embodiment
Total focal length of the entire system $f = 21.5 \sim 34.5$

| Lens | r | d | nd | νd |
|---|---|---|---|---|
| $L_1$ | $r_1 = 84.839$ | $d_1 = 2.4$ | $nd_1 = 1.79668$ | $\nu d_1 = 45.4$ |
|  | $r_2 = 22.425$ | $d_2 = 4.8$ |  |  |
| $L_2$ | $r_3 = 89.55$ | $d_3 = 2.0$ | $nd_2 = 1.79668$ | $\nu d_2 = 45.4$ |
|  | $r_4 = 29.42$ | $d_4 = 4.0$ |  |  |
| $L_3$ | $r_5 = 72.95$ | $d_5 = 2.0$ | $nd_3 = 1.79668$ | $\nu d_3 = 45.4$ |
|  | $r_6 = 42.56$ | $d_6 = 6.0$ |  |  |
| $L_4$ | $r_7 = 43.6$ | $d_7 = 3.8$ | $nd_4 = 1.72825$ | $\nu d_4 = 28.3$ |
|  | $r_8 = -3230$ | $d_8 = 1$ (variable) |  |  |
| $L_5$ | $r_9 = 61.32$ | $d_9 = 1.8$ | $nd_5 = 1.62374$ | $\nu d_5 = 47$ |
|  | $r_{10} = -80.084$ | $d_{10} = 3.0$ |  |  |
| $L_6$ | $r_{11} = 31.73$ | $d_{11} = 4.5$ | $nd_6 = 1.6223$ | $\nu d_6 = 53.1$ |
|  | $r_{12} = -22.088$ | $d_{12} = 1.0$ | $nd_7 = 1.79668$ | $\nu d_7 = 45.4$ |
|  | $r_{13} = 40.721$ | $d_{13} = 0.1$ |  |  |
| $L_7$ | $r_{14} = 24.05$ | $d_{14} = 3.0$ | $nd_8 = 1.54739$ | $\nu d_8 = 53.6$ |
|  | $r_{15} = 14.01$ | $d_{15} = 6.5$ | $nd_9 = 1.54814$ | $\nu d_9 = 45.9$ |
|  | $r_{16} = -55.266$ | $d_{16} = 2.0$ |  |  |
| $L_8$ | $r_{17} = -41.17$ | $d_{17} = 1.5$ | $nd_{10} = 1.80518$ | $\nu d_{10} = 25.5$ |
|  | $r_{18} = 24.62$ | $d_{18} = 2.0$ |  |  |
| $L_9$ | $r_{19} = -330.2$ | $d_{19} = 3.8$ | $nd_{11} = 1.50137$ | $\nu d_{11} = 56.5$ |
|  | $r_{20} = -20.9$ | $d_{20} = 0.4$ |  |  |
| $L_{10}$ | $r_{21} = -1262.13$ | $d_{21} = 2.1$ | $nd_{12} = 1.5168$ | $\nu d_{12} = 64.2$ |
|  | $r_{22} = -33.667$ |  |  |  |

$l = 22.504 \sim 0.5$
First surface ($r_1$) non-spherical
$K = 1, C_2 = 0$
$C_4 = 0.6226 \times 10^{-5} \quad C_6 = -0.3539 \times 10^{-8}$
$C_8 = 0.2546 \times 10^{-11} \quad C_{10} = -0.3371 \times 10^{-16}$
$f_{11} = -38.93 = 1.124 f_A$ -continued

Second Embodiment
Total focal length of the entire system f = 21.5 ~ 34.5

| | | | | | | |
|---|---|---|---|---|---|---|
| $L_1$ | $r_1$ = 87.25 | $d_1$ = 2.4 | $nd_1$ = 1.79668 | $vd_1$ = 45.4 | | |
| | $r_2$ = 20.945 | $d_2$ = 4.35 | | | | |
| $L_2$ | $r_3$ = 33.125 | $d_3$ = 2.0 | $nd_2$ = 1.50137 | $vd_2$ = 56.5 | | |
| | $r_4$ = 21.95 | $d_4$ = 4.0 | | | | |
| $L_3$ | $r_5$ = 67.2 | $d_5$ = 2.0 | $nd_3$ = 1.79668 | $vd_3$ = 45.4 | | |
| | $r_6$ = 27.96 | $d_6$ = 6.0 | | | | |
| $L_4$ | $r_7$ = 37.074 | $d_7$ = 3.8 | $nd_4$ = 1.72825 | $vd_4$ = 28.3 | | |
| | $r_8$ = 677.009 | $d_8$ = l (variable) | | | | |
| $L_5$ | $r_9$ = 64.66 | $d_9$ = 1.8 | $nd_5$ = 1.67003 | $vd_5$ = 47.2 | | |
| | $r_{10}$ = −78.003 | $d_{10}$ = 3.0 | | | | |
| $L_6$ | $r_{11}$ = 29.692 | $d_{11}$ = 4.497 | $nd_6$ = 1.6223 | $vd_6$ = 53.1 | | |
| | $r_{12}$ = −22.088 | $d_{12}$ = 1.0 | $nd_7$ = 1.79668 | $vd_7$ = 45.4 | | |
| | $r_{13}$ = 33.203 | $d_{13}$ = 0.1 | | | | |
| $L_7$ | $r_{14}$ = 24.71 | $d_{14}$ = 3.0 | $nd_8$ = 1.54739 | $vd_8$ = 53.6 | | |
| | $r_{15}$ = 14.01 | $d_{15}$ = 6.5 | $nd_9$ = 1.54814 | $vd_9$ = 45.9 | | |
| | $r_{16}$ = −46.087 | $d_{16}$ = 2.0 | | | | |
| $L_8$ | $r_{17}$ = −34.63 | $d_{17}$ = 1.5 | $nd_{10}$ = 1.80518 | $vd_{10}$ = 25.5 | | |
| | $r_{18}$ = 27.53 | $d_{18}$ = 2.0 | | | | |
| $L_9$ | $r_{19}$ = −179.709 | $d_{19}$ = 3.8 | $nd_{11}$ = 1.50137 | $vd_{11}$ = 56.5 | | |
| | $r_{20}$ = −19.92 | $d_{20}$ = 0.4 | | | | |
| $L_{10}$ | $r_{21}$ = −1000.00 | $d_{21}$ = 2.1 | $nd_{12}$ = 1.51835 | $vd_{12}$ = 60.3 | | |
| | $r_{22}$ = −30.653 | | | | | | l = 22.517 ~ 0.513
Third surface ($r_3$) non-spherical
K = 1, $C_2$ = 0
$C_4 = 0.1986 \times 10^{-4}$ $C_6 = 0.1822 \times 10^{-7}$
$C_8 = 0.1956 \times 10^{-10}$ $C_{10} = 0.216 \times 10^{-12}$
$f_{11} = -35.16 = 1.006fA$

Third Embodiment
Total focal length of the entire sustem f = 21.5 ~ 34.5

| | | | | | |
|---|---|---|---|---|---|
| $L_1$ | $r_1$ = 97.4 | $d_1$ = 2.4 | $nd_1$ = 1.79668 | $vd_1$ = 45.4 | |
| | $r_2$ = 23 | $d_2$ = 4.77 | | | |
| $L_2$ | $r_3$ = 88 | $d_3$ = 2.0 | $nd_2$ = 1.79668 | $vd_2$ = 45.4 | |
| | $r_4$ = 29.92 | $d_4$ = 4.0 | | | |
| $L_3$ | $r_5$ = 75.6 | $d_5$ = 2.0 | $nd_3$ = 1.79668 | $vd_3$ = 45.4 | |
| | $r_6$ = 42.07 | $d_6$ = 6.15 | | | |
| $L_4$ | $r_7$ = 44.887 | $d_7$ = 3.8 | $nd_4$ = 1.72825 | $vd_4$ = 28.3 | |
| | $r_8$ = −847.428 | $d_8$ = l (variable) | | | |
| $L_5$ | $r_9$ = 69.2 | $d_9$ = 1.8 | $nd_5$ = 1.62374 | $vd_5$ = 47 | |
| | $r_{10}$ = −92.85 | $d_{10}$ = 3.0 | | | |
| $L_6$ | $r_{11}$ = 32.09 | $d_{11}$ = 4.5 | $nd_6$ = 1.62374 | $vd_6$ = 47 | |
| | $r_{12}$ = −26.167 | $d_{12}$ = 1.0 | $nd_7$ = 1.79668 | $vd_7$ = 45.4 | |
| | $r_{13}$ = 49.053 | $d_{13}$ = 0.1 | | | |
| $L_7$ | $r_{14}$ = 22.072 | $d_{14}$ = 8.532 | $nd_8$ = 1.54739 | $vd_8$ = 53.6 | |
| | $r_{16}$ = −93.3 | $d_{16}$ = 2.0 | | | |
| $L_8$ | $r_{17}$ = −40.965 | $d_{17}$ = 1.5 | $nd_{10}$ = 1.80518 | $vd_{10}$ = 25.5 | |
| | $r_{18}$ = 22.941 | $d_{18}$ = 2.0 | | | |
| $L_9$ | $r_{19}$ = −4438.92 | $d_{19}$ = 4.0 | $nd_{11}$ = 1.50137 | $vd_{11}$ = 56.5 | |
| | $r_{20}$ = −19.604 | $d_{20}$ = 0.4 | | | |
| $L_{10}$ | $r_{21}$ = 13256.965 | $d_{21}$ = 2.1 | $nd_{12}$ = 1.51823 | $vd_{12}$ = 59 | |
| | $r_{22}$ = −39.89 | | | | | l = 22.582 ~ 0.6
First surface ($r_1$) non-spherical
K = 1, $C_2$ = 0
$C_4 = 0.6062 \times 10^{-5}$ $C_6 = -0.3366 \times 10^{-8}$
$C_8 = 0.2327 \times 10^{-11}$ $C_{10} = -0.4809 \times 10^{-16}$
$f_{11} = -38.34 = 1.097fA$

I claim:

1. A zoom lens which comprises, in succession from the object side, a divergent lens group (A) and a convergent lens group (B) and whose magnification is changed by relative movement of the two groups and wherein the divergent lens group (A) comprises four lenses, i.e., in succession from the object side, three continuous negative meniscus lenses ($L_1$, $L_2$, $L_3$) having their respective convex surfaces facing the object side and a positive lens ($L_4$) having its surface of sharper curvature facing the object side and the convergent lens group (B) comprises, in succession from the object side, a single biconvex positive lens ($L_5$), a meniscus lens ($L_6$) comprising a doublet and having its convex surface facing the object side, a positive lens ($L_7$), a negative lens ($L_8$) and two continuous positive lenses ($L_9$, $L_{10}$), the zoom lens satisfying the following conditions:

(I) $r_1 > 3.4 f_W$ (II) $0.9|f_A| < |f_{11}| < 1.3|f_A|$ ($f_{11} < 0, f_A < 0$)
(III) $0.9 f_W > d_{11} + d_{12} + d_{14} + d_{15} > 0.6 f_W$
(IV) $1.6 f_W > |r_{12}| > 0.8 f_W$ ($r_{12} < 0$)

where $f_A$ represents the focal length of the divergent lens group (A), $f_{11}$ represents the focal length of the negative meniscus lens ($L_1$) which is most adjacent to the object side, r represents the curvature radii of the lens surfaces, d represents the thicknesses of the lenses and the air spaces between the lenses, the subscripts represent the order from the object side, and $f_W$ represents the focal length of the entire system at the wide angle end.

2. A zoom lens according to claim 1, wherein numerical data are as follows:

| | | | First Embodiment | | | | | |
|---|---|---|---|---|---|---|---|---|
| | | | Total focal length of the entire system f = 21.5 ~ 34.5 | | | | | |
| $L_1$ | $r_1$ = | 84.839 | $d_1$ = 2.4 | $nd_1$ | = 1.79668 | $vd_1$ | = 45.4 |
| | $r_2$ = | 22.425 | $d_2$ = 4.8 | | | | |
| $L_2$ | $r_3$ = | 89.55 | $d_3$ = 2.0 | $nd_2$ | = 1.79668 | $vd_2$ | = 45.4 |
| | $r_4$ = | 29.42 | $d_4$ = 4.0 | | | | |
| $L_3$ | $r_5$ = | 72.95 | $d_5$ = 2.0 | $nd_3$ | = 1.79668 | $vd_3$ | = 45.4 |
| | $r_6$ = | 42.56 | $d_6$ = 6.0 | | | | |
| $L_4$ | $r_7$ = | 43.6 | $d_7$ = 3.8 | $nd_4$ | = 1.72825 | $vd_4$ | = 28.3 |
| | $r_8$ = | −3230 | $d_8$ = l (variable) | | | | |
| $L_5$ | $r_9$ = | 61.32 | $d_9$ = 1.8 | $nd_5$ | = 1.62374 | $vd_5$ | = 47 |
| | $r_{10}$ = | −80.084 | $d_{10}$ = 3.0 | | | | |
| $L_6$ | $r_{11}$ = | 31.73 | $d_{11}$ = 4.5 | $nd_6$ | = 1.6223 | $vd_6$ | = 53.1 |
| | $r_{12}$ = | −22.088 | $d_{12}$ = 1.0 | $nd_7$ | = 1.79668 | $vd_7$ | = 45.4 |
| | $r_{13}$ = | 40.721 | $d_{13}$ = 0.1 | | | | |
| $L_7$ | $r_{14}$ = | 24.05 | $d_{14}$ = 3.0 | $nd_8$ | = 1.54739 | $vd_8$ | = 53.6 |
| | $r_{15}$ = | 14.01 | $d_{15}$ = 6.5 | $nd_9$ | = 1.54814 | $vd_9$ | = 45.9 |
| | $r_{16}$ = | −55.266 | $d_{16}$ = 2.0 | | | | |
| $L_8$ | $r_{17}$ = | −41.17 | $d_{17}$ = 1.5 | $nd_{10}$ | = 1.80518 | $vd_{10}$ | = 25.5 |
| | $r_{18}$ = | 24.62 | $d_{18}$ = 2.0 | | | | |
| $L_9$ | $r_{19}$ = | −330.2 | $d_{19}$ = 3.8 | $nd_{11}$ | = 1.50137 | $vd_{11}$ | = 56.5 |
| | $r_{20}$ = | −20.9 | $d_{20}$ = 0.4 | | | | |
| $L_{10}$ | $r_{21}$ = | −1262.13 | $d_{21}$ = 2.1 | $nd_{12}$ | = 1.5168 | $vd_{12}$ | = 64.2 |
| | $r_{22}$ = | −33.67 | | | | | | l = 22.504 ~ 0.5
First surface ($r_1$) non-spherical
K = 1, $C_2$ = 0
$C_4 = 0.6226 \times 10^{-5}$ $C_6 = -0.3539 \times 10^{-8}$
$C_8 = 0.2546 \times 10^{-11}$ $C_{10} = -0.3371 \times 10^{-16}$
$f_{11} = -38.93 = 1.124 f_A$ 3. A zoom lens according to claim 1, wherein numerical data are as follows:

| | | | Second Embodiment | | | | | |
|---|---|---|---|---|---|---|---|---|
| | | | Total focal length of the entire system f = 21.5 ~ 34.5 | | | | | |
| $L_1$ | $r_1$ = | 87.25 | $d_1$ = 2.4 | $nd_1$ | = 1.79668 | $vd_1$ | = 45.4 |
| | $r_2$ = | 20.945 | $d_2$ = 4.35 | | | | |
| $L_2$ | $r_3$ = | 33.125 | $d_3$ = 2.0 | $nd_2$ | = 1.50137 | $vd_2$ | = 56.5 |
| | $r_4$ = | 21.95 | $d_4$ = 4.0 | | | | |
| $L_3$ | $r_5$ = | 67.2 | $d_5$ = 2.0 | $nd_3$ | = 1.79668 | $vd_3$ | = 45.4 |
| | $r_6$ = | 27.96 | $d_6$ = 6.0 | | | | |
| $L_4$ | $r_7$ = | 37.074 | $d_7$ = 3.8 | $nd_4$ | = 1.72825 | $vd_4$ | = 28.3 |
| | $r_8$ = | 677.009 | $d_8$ = l (variable) | | | | |
| $L_5$ | $r_9$ = | 64.66 | $d_9$ = 1.8 | $nd_5$ | = 1.67003 | $vd_5$ | = 47.2 |
| | $r_{10}$ = | −78.003 | $d_{10}$ = 3.0 | | | | |
| | $r_{11}$ = | 29.692 | $d_{11}$ = 4.497 | $nd_6$ | = 1.6223 | $vd_6$ | = 53.1 |

-continued

Second Embodiment
Total focal length of the entire system $f = 21.5 \sim 34.5$

| | | | | | | | |
|---|---|---|---|---|---|---|---|
| $L_6$ | $r_{12} =$ | $-22.088$ | $d_{12} = 1.0$ | $nd_7 = 1.79668$ | | $vd_7 = 45.4$ | |
| | $r_{13} =$ | $33.203$ | $d_{13} = 0.1$ | | | | |
| $L_7$ | $r_{14} =$ | $24.71$ | $d_{14} = 3.0$ | $nd_8 = 1.54739$ | | $vd_8 = 53.6$ | |
| | $r_{15} =$ | $14.01$ | $d_{15} = 6.5$ | $nd_9 = 1.54814$ | | $vd_9 = 45.9$ | |
| | $r_{16} =$ | $-46.087$ | $d_{16} = 2.0$ | | | | |
| $L_8$ | $r_{17} =$ | $-34.63$ | $d_{17} = 1.5$ | $nd_{10} = 1.80518$ | | $vd_{10} = 25.5$ | |
| | $r_{18} =$ | $27.53$ | $d_{18} = 2.0$ | | | | |
| $L_9$ | $r_{19} =$ | $-179.709$ | $d_{19} = 3.8$ | $nd_{11} = 1.50137$ | | $vd_{11} = 56.5$ | |
| | $r_{20} =$ | $-19.92$ | $d_{20} = 0.4$ | | | | |
| $L_{10}$ | $r_{21} =$ | $-1000.00$ | $d_{21} = 2.1$ | $nd_{12} = 1.51835$ | | $vd_{12} = 60.3$ | |
| | $r_{22} =$ | $-30.653$ | | | | | |

$l = 22.517 \sim 0.513$
Third surface ($r_3$) non-spherical
$K = 1, C_2 = 0$
$C_4 = 0.1986 \times 10^{-4}\ C_6 = 0.1822 \times 10^{-7}$
$C_8 = 0.1956 \times 10^{-10}\ C_{10} = 0.216 \times 10^{-12}$
$f_{11} = -35.16 = 1.006 f_A$ 4. A zoom lens according to claim 1, wherein numerical data are as follows:

Third Embodiment
Total focal length of the entire system $f = 21.5 \sim 34.5$

| | | | | | | |
|---|---|---|---|---|---|---|
| $L_1$ | $r_1 =$ | $97.4$ | $d_1 = 2.4$ | $nd_1 = 1.79668$ | $vd_1 = 45.4$ |
| | $r_2 =$ | $23$ | $d_2 = 4.77$ | | |
| $L_2$ | $r_3 =$ | $88$ | $d_3 = 2.0$ | $nd_2 = 1.79668$ | $vd_2 = 45.4$ |
| | $r_4 =$ | $29.92$ | $d_4 = 4.0$ | | |
| $L_3$ | $r_5 =$ | $75.6$ | $d_5 = 2.0$ | $nd_3 = 1.79668$ | $vd_3 = 45.4$ |
| | $r_6 =$ | $42.07$ | $d_6 = 6.15$ | | |
| $L_4$ | $r_7 =$ | $44.887$ | $d_7 = 3.8$ | $nd_4 = 1.72825$ | $vd_4 = 28.3$ |
| | $r_8 =$ | $-847.428$ | $d_8 = l$ (variable) | | |
| $L_5$ | $r_9 =$ | $69.2$ | $d_9 = 1.8$ | $nd_5 = 1.62374$ | $vd_5\ 47$ |
| | $r_{10} =$ | $-92.85$ | $d_{10} = 3.0$ | | |
| $L_6$ | $r_{11} =$ | $32.09$ | $d_{11} = 4.5$ | $nd_6 = 1.62374$ | $vd_6 = 47$ |
| | $r_{12} =$ | $-26.167$ | $d_{12} = 1.0$ | $nd_7 = 1.79668$ | $vd_7 = 45.4$ |
| | $r_{13} =$ | $49.053$ | $d_{13} = 0.1$ | | |
| $L_7$ | $r_{14} =$ | $22.072$ | $d_{14} = 8.532$ | $nd_8 = 1.54739$ | $vd_8 = 53.6$ |
| | $r_{16} =$ | $-93.3$ | $d_{16} = 2.0$ | | |
| $L_8$ | $r_{17} =$ | $-40.965$ | $d_{17} = 1.5$ | $nd_{10} = 1.80518$ | $vd_{10} = 25.5$ |
| | $r_{18} =$ | $22.941$ | $d_{18} = 2.0$ | | |
| $L_9$ | $r_{19} =$ | $-4438.92$ | $d_{19} = 4.0$ | $nd_{11} = 1.50137$ | $vd_{11} = 56.5$ |
| | $r_{20} =$ | $-19.604$ | $d_{20} = 0.4$ | | |
| $L_{10}$ | $r_{21} =$ | $13256.965$ | $d_{21} = 2.1$ | $nd_{12} = 1.51823$ | $vd_{12} = 59$ |
| | $r_{22} =$ | $-39.89$ | | | |

$l = 22.582 \sim 0.6$
First surface ($r_1$) non spherical
$K = 1, C_2 = 0$
$C_4 = 0.6062 \times 10^{-5}\ C_6 = -0.3366 \times 10^{-8}$
$C_8 = 0.2327 \times 10^{-11}\ C_{10} = -0.4809 \times 10^{-16}$
$f_{11} = -38.34 = 1.097 f_A$

* * * * *